Figure 5:
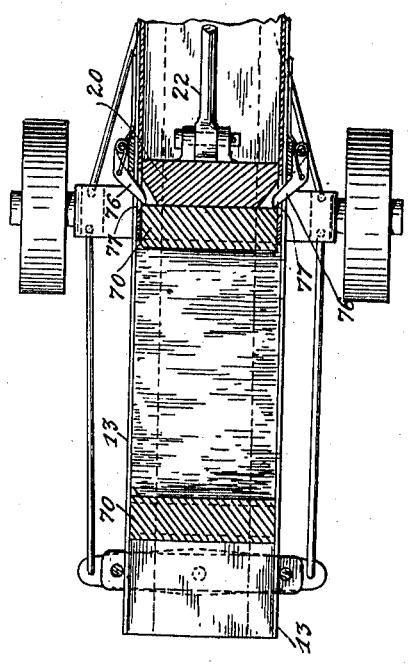

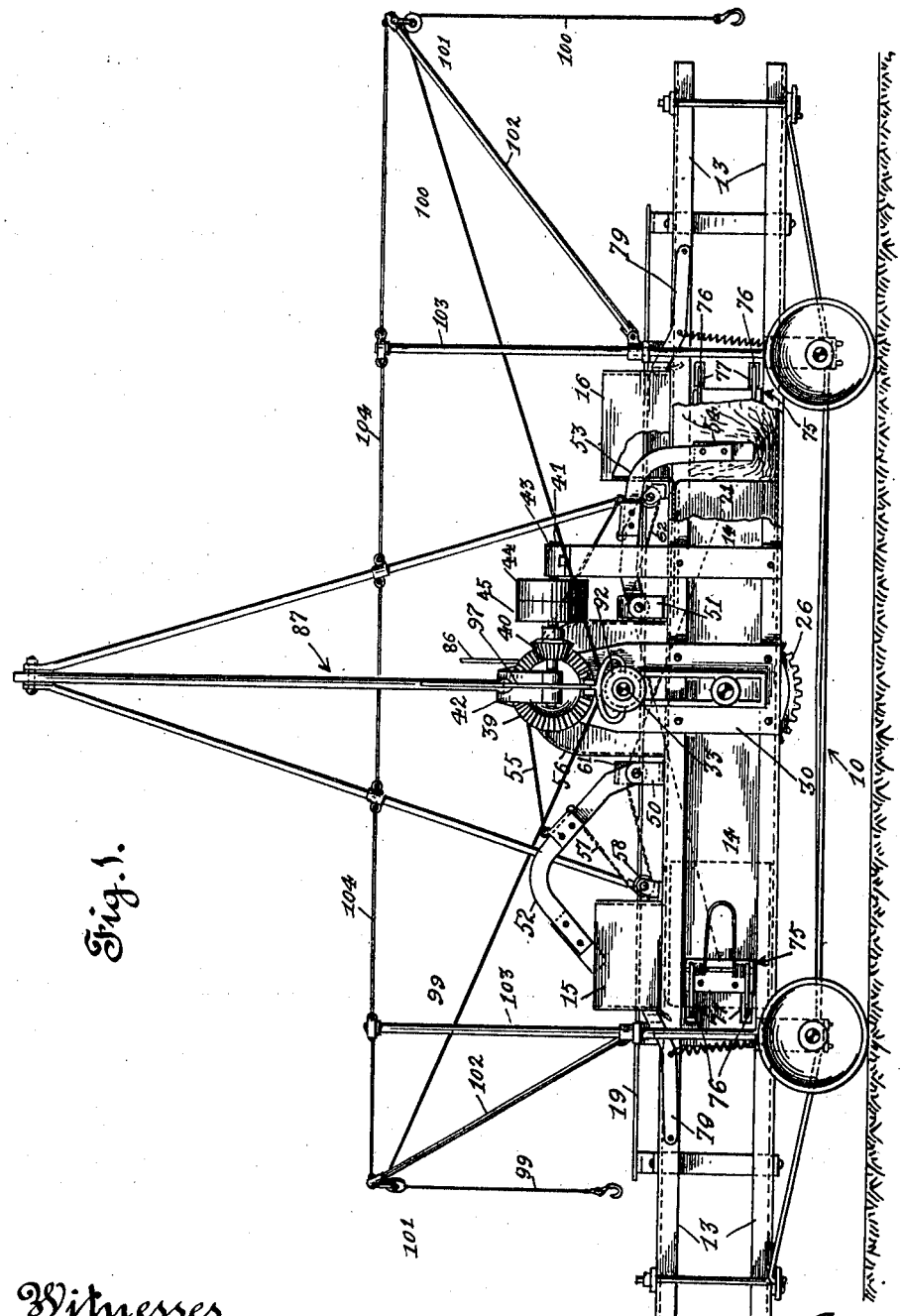

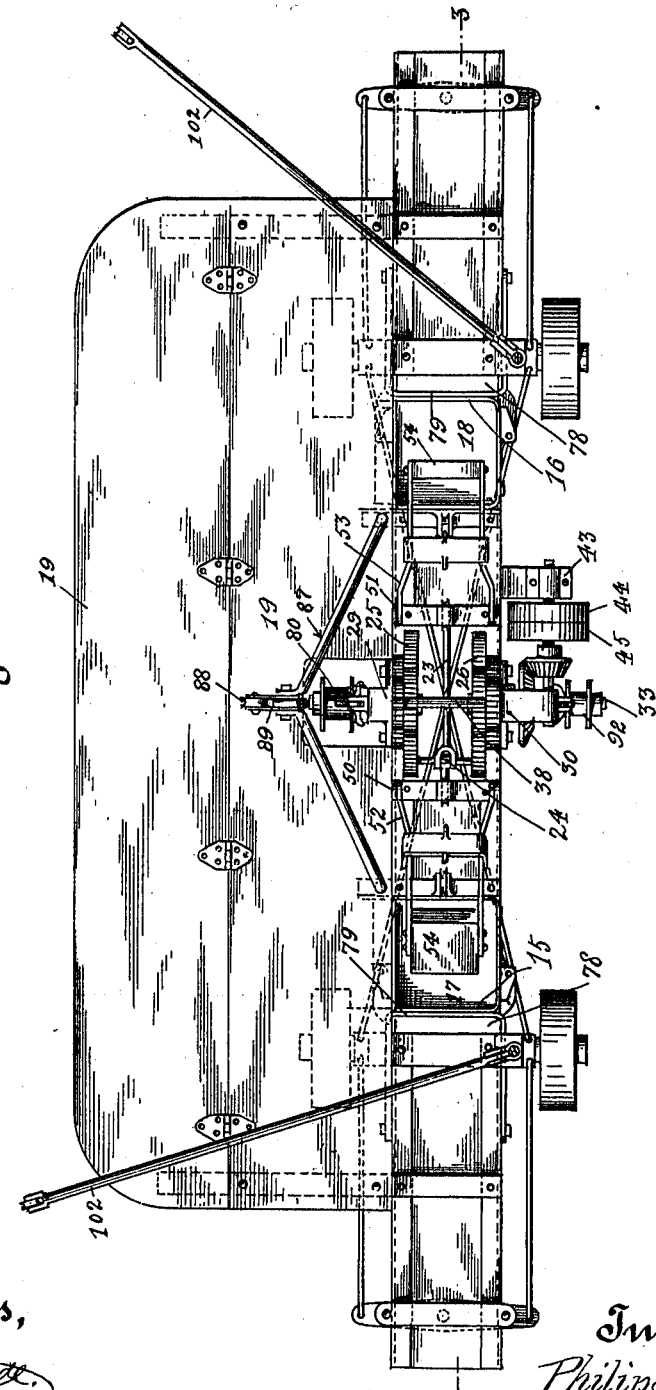

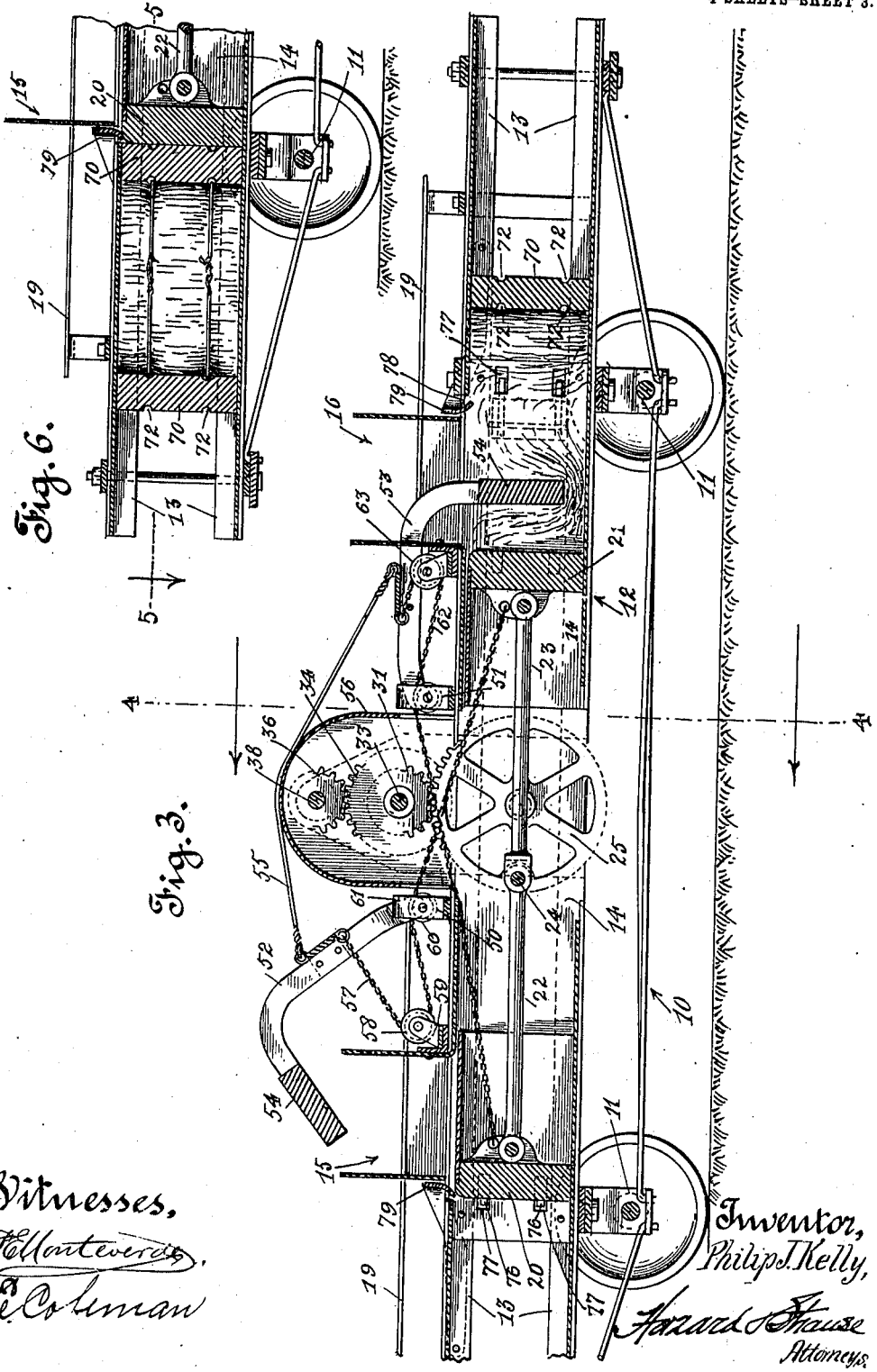

P. J. KELLY.
BALING PRESS.
APPLICATION FILED AUG. 9, 1909.

990,142.

Patented Apr. 18, 1911.

4 SHEETS—SHEET 4.

Witnesses,

Inventor,
Philip J. Kelly,

Attorneys.

UNITED STATES PATENT OFFICE.

PHILIP J. KELLY, OF LOS ANGELES, CALIFORNIA.

BALING-PRESS.

990,142. Specification of Letters Patent. Patented Apr. 18, 1911.

Application filed August 9, 1909. Serial No. 511,866.

*To all whom it may concern:*

Be it known that I, PHILIP J. KELLY, a citizen of the United States, residing at Los Angeles, in the county of Los Angeles and State of California, have invented new and useful Improvements in Baling-Presses, of which the following is a specification.

This invention has relation to that class of power operated compressing mechanisms that are employed in baling various loose fibrous substances into compact masses or bales to admit of convenient handling and easy transportation from one point to another.

The hereinafter described apparatus has been especially designed for the rapid compression of hay or like material into bales of usual sizes and configurations, and an important object thereof is to provide a portable power driven apparatus that may be operated directly in the field from which the material to be baled is harvested, and which is capable of simultaneously feeding the material to one baling chamber while compressing in the other.

Another object is to provide a mechanism wherein feeding mechanism is actuated and controlled by the operation of the compressing mechanism.

Another object is to provide a portable apparatus adapted to form bales of predetermined sizes and weights, and one in which the baling operation is carried on continuously.

Another object is to provide an apparatus, whereby the uncompleted bale of hay may be automatically controlled while it is being added to and compressed by successive feeding and compressing operations until it has reached the desired tying dimensions, and before final ejection from the baling chambers.

Another object is to provide a machine in which the mechanism for handling the material to be compressed into the finished bale is operated and controlled by the actuating mechanism of the machine.

A further object is to provide an apparatus in which the various power actuated mechanisms are directly controlled by a single operator, and one which is simple in construction, efficient in operation, and capable of baling large quantities of material in the minimum time.

In the accomplishment of the above recited objects, I preferably employ a rectangular frame formed of angle iron and sheet metal, provided with a compression chamber at either end, this frame being mounted on suitable trucks to permit of easy transportation from one place to another. Midway of the frame is mounted the operating mechanism which is actuated from a source of power, such as an internal combustion engine (not shown), the compression pistons being connected directly to the operating mechanism. Each compression chamber is provided with a feed hopper, and suitable feeding mechanisms are mounted on either side of the actuating mechanism, these feeding mechanisms being connected directly to the pistons and continuously operated thereby. Suitable means are provided for forming the bales into suitable dimensions, and means are also provided for controlling the operation of the apparatus and for hauling the material thereto.

Figure 4:
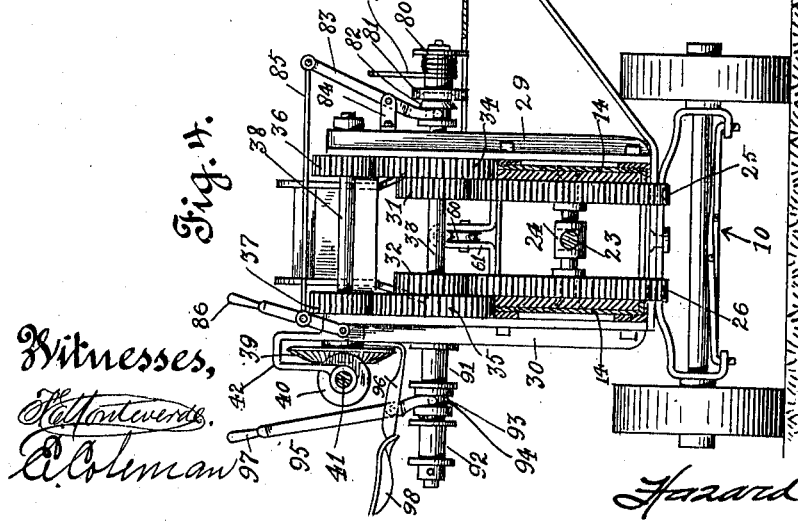

In the annexed drawings attached hereto and forming a part of this specification, Figure 1.— is a side elevation of my complete apparatus, illustrating the feeding and compressing mechanisms in their extreme positions, parts being broken away for clarity of illustration. Fig. 2.— is a plan view of my complete apparatus. Fig. 3.— is an enlarged central longitudinal section through my complete apparatus, taken on line 3—3 of Fig. 2. Fig. 4.— is a transverse section taken through the machine, taken on line 4—4 of Fig. 3. Fig. 5.— is an enlarged partial longitudinal section of an end portion of one of the baling chambers, showing a bale in a complete condition, taken on line 5—5 of Fig. 6. Fig. 6.— is a sectional elevation of that portion of the machine illustrated in Fig. 5.

Referring more specifically to the drawings, the apparatus consists essentially of a suitable running gear 10, provided with the usual trucks 11 for the purpose of transporting the apparatus from one place of use to another. The trucks are connected together by a guiding means adapted to keep the rear truck in alinement with the front truck while the machine is being moved.

Rigidly mounted on the running gear is a rectangular metallic frame 12 formed of longitudinally extending angle irons 13, that portion of the sides of the frame lying between the trucks being closed with metallic sheet iron plates 14, and forming an inclosed baling chamber. The outer ends of the frame that form the baling chamber are smaller in area than that portion of the frame that lies between the trucks, the purpose being to choke the ends so that the material will be compressed into tighter bales before final ejection.

Bolted or otherwise secured to the frame 12 and extending at right angles therefrom is a platform 19, divided longitudinally in two portions hinged together, so that the same may be folded into a compact compass when the apparatus is moved from place to place.

The top of the inclosed portion of the frame is provided with feed hoppers 15, 16 having openings into which the material to be baled is fed to the baling chambers 17, 18. These baling chambers are provided with reciprocating pistons 20, 21 having piston rods 22, 23 pivoted thereto at the rear thereof and extending toward the center of the machine where they are rigidly secured to a transversely disposed cross-head 24, the ends of which are rigidly secured to gear wheels 25, 26 journaled on shafts that are mounted in bearings 29, 30, secured to the opposite vertical sides of frame 12. The ends of the piston rods 22, 23 are connected to the gear wheels 25, 26 at the same point, so that as the gear wheels revolve both pistons will be reciprocated in the same direction, thus permitting the material to be fed to one chamber while it is being compressed in the other. Gear wheels 25, 26 are in mesh with smaller gears 31, 32 rigidly secured to a rotatable shaft 33 that extends transversely of the frame 12 of the machine and is journaled in bearings 29 and 30. The outer ends of this shaft preferably project beyond the face of each of the bearings and carry cable winding mechanisms that will be more particularly described hereinafter. Shaft 33 also carries gear wheels 34, 35 rigidly mounted thereon which mesh with smaller gears 36, 37 rigidly secured to a rotatable shaft 38, mounted in the upper ends of bearings 29 and 30. One end of shaft 38 extends beyond the outer face of bearing 30 and has rigidly affixed thereto a bevel gear 39, which is in mesh at all times with a bevel pinion 40 rigidly secured to a counter-shaft 41, one end of which is journaled in a bearing 42 secured to bearing 30, and the other end journaled in a bearing 43 which is rigidly secured to the frame of the apparatus. Interposed between pinion 40 and bearing 43 are fast and loose pulleys 44, 45, respectively, which are belted to a suitable source of power (not shown), preferably an explosion engine.

By the above described transmission gear, a powerful leverage is exerted on the pistons, thus enabling them to compress the material fed into the baling chambers through the hoppers into a tight compact and solid mass.

Pivotally mounted in bearings 50, 51 secured to the upper face of the machine and to either side of bearings 29, 30 are material feeding arms 52, 53. These arms are preferably curved at their outer ends, as clearly illustrated in the various views of the drawings, and a transversely disposed tamping block 54 is secured to each of their extreme outer ends. The feeding arms are designed to be actuated in unison with the movements of the pistons, the outer ends of the arms entering the hoppers 15, 16 force the material downwardly and into the baling or compressing chambers. Arms 52, 53 are connected together by a flexible cable 55 which passes over the rounded dome of a metallic casing 56 that incloses the gear operating mechanism of the apparatus. Cable 55 is connected to the material feeding arms so that one arm will be in a lowered position while the other is raised, thus permitting material to be fed to one chamber while the piston is compressing in the other as clearly indicated in Figs. 1 and 3 of the drawings.

Connected to arm 52 and to the rear of the point where cable 55 is secured, is a chain cable 57 which passes over a sheave 58 journaled in a bearing 59, rigidly mounted on the upper face of the machine frame adjacent the hopper 15. Chain 57 passes around sheave 58 to a sheave 60 journaled in a bearing 61 mounted on the upper face of the machine adjacent casing 56, from thence the chain passes downwardly to the rear of the compressing chambers and is secured to the rear face of piston 21. The other arm 53 is connected to piston 20 in exactly the same manner as piston 21 is connected to arm 52, the chain 62 rigidly secured to the arm passing over sheaves 63, 64 and the end being secured to the rear face of piston 20.

By the above described arrangement of cable 55 and chains 57 and 62, the arms 52, 53 will be forced into and out of the baling chambers alternately on the reciprocation of the pistons, thereby enabling an operator to supply material to one of the hoppers, while the other arm is operating in the adjacent hopper.

It will be observed by means of the above described mechanism that I am enabled to bale the material which is fed to the apparatus continuously. The finished bales being ejected from the chambers alternately.

In order to form the material into bales of predetermined dimensions and weights, I have provided a plurality of division blocks 70, which are designed to be inserted into the baling chambers through the hoppers by the operators, whenever it is apparent that a bale of proper size has been formed in either chamber. The vertical faces of each of these blocks are provided with a plurality of transverse grooves 72, through which wires are passed by the wireman to tie the formed bales together, as clearly illustrated in Fig. 6 of the drawings, the grooves 72 permitting the ready insertion of wires therethrough.

It will be observed that as only a small quantity of the material is fed to the baling chambers at one time, it would take considerable time to form a bale of the required dimensions, and to provide against a movement of the partially compressed bales toward the hoppers when the pistons recede, I have provided on either side of the vertical faces of the frame 12, a bale retaining mechanism 75, which preferably consists of a pair of spring operated detents 76, which extend through apertures 77 formed in the sides of the frame of the apparatus projecting into the path of the bale travel and locking the partially compressed bale against any inward movement when the pressure of the piston is released, and permitting at the same time additional material to be added to the uncompleted bale. The upper face of frame 12 is provided with transversely extending slots 78, one adjacent each hopper, through which project into the baling chambers spring controlled detent bars 79 their lower lips turned toward the ends of the machine. These detents are provided to assist the detents 76 mounted in the sides of the baling chambers in holding the partially compressed bale when the pressure thereon has been relieved.

Shaft 33 is provided on the end that projects beyond the face of bearing 29, with a winding spool 80 loosely mounted thereon, the inner face of the spool being formed into a female friction clutch member 81 adapted to be engaged by an annularly grooved male cone-clutch member 82 which is slidable on said shaft and rotates therewith. The groove in this clutch member is engaged by the bifurcated end of a lever 83 pivoted in a bearing 84 secured to bearing 29. The upper end of this lever is pivoted to a transversely disposed rod 85, which extends across the machine, its other end being pivoted to a hand lever 86 that is pivoted to bearing 42 secured to the vertically disposed bearing 30. This winding spool 80 is for the purpose of drawing the loose baling material from the hay stack to the apparatus.

Mounted on the upper face of the apparatus and approximately in the center thereof is a metallic tripod 87 which extends upwardly a considerable distance above the machine, and is provided on its upper end with a sheave 88 journaled in a pivoted bearing 89, a cable 90 secured to winding spool 80 extends upwardly and passes over sheave 88, the free end being provided with suitable hay grappling tongs (not shown). On the opposite end of shaft 33 is mounted a pair of winding spools 91, 92 loosely mounted thereon, the two inner adjacent faces being formed into female friction clutching members adapted to be engaged by a double cone male clutch 93, provided with an annular groove 94 that is engaged by the lower end of a bifurcated shifting lever 95 pivoted to a support 96 that projects from the face of bearing 30. The upper end of this lever terminates in a handle 97, and the outer end of the support is formed into an operators seat 98. By means of these winding spools 91, 92 the completed bales as they issue from the baling chambers may be weighed and shifted to loading wagons (not shown), the cables 99, 100, being operated alternately from their respective winding spools. The inner ends of the cable are wound upon the spools passing upwardly over pulleys 101 journaled in the upper end of booms 102 that are pivoted at their lower ends to upright supports 103 rigidly secured to the frame of the apparatus. The tripod 87 and uprights 103 are connected by cables 104 to insure stability.

The operation of the apparatus is as follows: When the apparatus is in position and ready for operation, it is belted or connected to a source of power, preferably an engine of the explosive type (not shown) which may be located at some distance therefrom. The apparatus is then set in motion by the operator from his seat on the machine and cable 90 is paid out from winding spool 80 to the hay stack (not shown) where another operator fastens the grapple (not shown) to a quantity of loose hay, the engineer throwing clutch member 82 into an engagement with the spool 80 draws the loose material to the platform 19, continuing to do so as long as the apparatus is in operation. When a sufficient quantity of the material is deposited on the platform 19 the "feeder" operators feed the loose hay from the table through the hoppers into the baling chambers, that is when the feeding arms are in their raised position to permit the entrance of the hay to the hoppers. Before inserting the material into the hoppers the feeder men first insert groove division blocks 70 in each hopper, the pistons forcing them forwardly the length of their stroke. The loose hay is now introduced into the baling chambers through the hoppers by the feeder men, the feeder arms 52, 53 forcing the material downwardly into the chambers where the moving pistons force it forwardly against the division blocks 70. This operation is repeatedly continued until the bale has assumed the definite proportions, when the feeder men insert additional division blocks through the hoppers into the chambers, the pistons forcing the blocks against the completed bales. When the last blocks have been inserted and during the time that the pistons are exerting a pressure against them, the wiremen thread the wires through the grooves formed in their faces and rigidly secure the bale in its compressed condition. The operation of baling is carried on continuously, the succeeding bale forcing the one that has been wired out of the chambers where one of the weighers at either end of the machine attaches it to the end of cable 99 for delivery to loading wagons, or to a portion of the field adjacent to the machine where they will not interfere with the operations, the machine operator throwing clutch lever 97 into or out of engagement with the winding spools 91, 92, as occasion demands.

It will be noted from the foregoing description that as the material is first fed to one baling chamber and then to the other, the finished bales will not be ejected simultaneously, thus enabling the machine operator to handle the bales as they issue from the chambers successively, and at the same time operate the hay grappling mechanism that draws the loose hay to the machine. It will also be observed that as the power actuating mechanism of the apparatus is located in the center of the machine, and is also operatively connected to the compressing mechanisms, that I am enabled to bale the material much more rapidly than with a single machine, and at the same time economizing in the use of motive power.

Having described my invention what I claim as new and desire to secure by Letters Patent is:—

1. A baling press having a pair of oppositely disposed baling chambers, pistons sliding in said chambers adapted to form a bale, means disposed between said pistons and connected therewith for reciprocating the same simultaneously, said baling chambers having feed openings on the upper sides thereof, independently pivoted feed arms adapted to move in and out through said feed openings, a flexible cable connecting one of said arms with the piston remote therefrom and affording means for pulling said arm down into its feed opening, a second flexible cable connecting the other feed arm with the other piston-head and adapted to pull said other feed arm downwardly into its opening, and means independent of said cables for connecting said arms together and arranged so that the depression of one arm raises the other arm.

2. A baling press having a pair of oppositely disposed baling chambers, pistons sliding in said chambers adapted to form a bale, means disposed between said pistons and connected therewith for reciprocating the same simultaneously, said baling chambers having feed openings on the upper sides thereof, feed arms pivotally mounted independently and adapted to move in and out through said feed openings, a flexible cable connecting one of said arms with the piston remote therefrom and affording means for pulling said arm down into its feed opening, a second flexible cable connecting the other feed arm with the other piston head and adapted to pull said other feed arm downwardly into its opening, a flexible connection between said arms independent of said cables arranged so that the depression of one arm raises the other arm, and means for supporting said connection between said arms.

3. A baling press having a pair of oppositely disposed baling chambers, pistons reciprocating in said chambers, mechanism disposed between said chambers and adapted to reciprocate said pistons, said baling chambers having feed openings in the upper sides thereof, longitudinally disposed feed arms arranged respectively adjacent to said baling chambers and pivotally supported independently at their adjacent extremities, cables connecting said feed arms with the pistons remote therefrom, guide sheaves for said cables arranged so that the advancing movement of one piston depresses the feed arm of the opposite baling chamber, a cable connecting said feed arms and arranged to raise one of said feed arms when the other feed arm is depressed, and means for supporting said last cable between said arms.

4. A baling press having a pair of oppositely disposed alining baling chambers, pistons reciprocating in said baling chambers, mechanism between said pistons and connected therewith for reciprocating the same, said baling chambers having feed openings on the upper sides thereof, feed arms pivotally mounted independently at their inner ends extending longitudinally of said baling chambers and coöperating respectively with said feed openings and automatic means for alternately raising and lowering said arms as the pistons reciprocate, a cable directly connecting said arms and adapted to raise one arm when the other arm is depressed, and means for supporting said cable between said arms.

5. A baling press comprising a pair of oppositely disposed baling chambers having feed openings on the upper sides thereof, mechanism disposed between said baling chambers, pistons connected with said mechanism and reciprocating in said baling chambers, feed arms pivotally mounted independently at their adjacent ends extending longitudinally of said baling chambers and coöperating respectively with said feed openings, automatic means for pulling said arms down alternately, a flexible cable directly connecting said arms and a case having a curved dome supporting said cable between said arms, said cable affording means for raising one of said arms when the other arm is depressed.

In witness that I claim the foregoing I have hereunto subscribed my name this 31st day of July, 1909.

P. J. KELLY.

Witnesses:
EDMUND A. STRAUSE,
ETHEL COLEMAN.

Copies of this patent may be obtained for five cents each, by addressing the "Commissioner of Patents, Washington, D. C."